(12) United States Patent
Oda et al.

(10) Patent No.: US 6,955,768 B2
(45) Date of Patent: Oct. 18, 2005

(54) PERMANENT MAGNET AND METHOD FOR PREPARATION THEREOF

(75) Inventors: Etsushi Oda, Mishima-gun (JP); Seiichi Hosokawa, Takarazuka (JP); Sachio Toyota, Saga (JP)

(73) Assignee: Neomax Co., Ltd., Osaka (JP)

( * ) Notice: Subject to any disclaimer, the term of this patent is extended or adjusted under 35 U.S.C. 154(b) by 0 days.

(21) Appl. No.: 10/466,935
(22) PCT Filed: Feb. 6, 2002
(86) PCT No.: PCT/JP02/00994
§ 371 (c)(1), (2), (4) Date: Jul. 22, 2003
(87) PCT Pub. No.: WO02/063640
PCT Pub. Date: Aug. 15, 2002

(65) Prior Publication Data
US 2004/0061090 A1 Apr. 1, 2004

(30) Foreign Application Priority Data
Feb. 7, 2001 (JP) ........................... 2001-030364
Aug. 10, 2001 (JP) ........................... 2001-243821

(51) Int. Cl.$^7$ ............................................. H01F 1/11
(52) U.S. Cl. ............................... 252/62.63; 252/62.62; 252/62.57; 428/694 GT; 428/964 B
(58) Field of Search ................. 428/694 GT, 694 B; 252/62.63, 62.62, 62.57

(56) References Cited

U.S. PATENT DOCUMENTS

| 4,855,205 A | * | 8/1989 | Saha et al. ................ 430/111.33 |
| 5,792,570 A | | 8/1998 | Ishikawa et al. |
| 6,086,781 A | | 7/2000 | Taguchi et al. |
| 6,139,766 A | | 10/2000 | Taguchi et al. |

FOREIGN PATENT DOCUMENTS

| JP | 11-224812 | 8/1999 |
| JP | 11-307331 | 11/1999 |

OTHER PUBLICATIONS

Translation for JP 11-224812.*
Du et al., "Magnetic Properties and High Temperature Composition of the $La_xBa_{(1-x)}Fe_{(12-x)}Zn_xO_{19}$ Ferrites", Journal of magnetism and magnetic materials 31–34 (1983) 793–794.
Smolenskii et al., "*Investigation of Ferrimagnets with the Structure of Magnetoplubbite and Garnet in Strong Pulse Magnetic Fields*", Bulletin of the Academy of Sciences of the USSR, No. 11, vol. 25 (1961) pp. 1405–1408.
Wei et al., "*The Temperature Dependence of Magnetic Properties of Zn–Ti Substituted Ba–Ferrite Particles for Magnetic Recording*", Journal of the Magnetics Society of Japan, vol. 21, Supplement No. S2 (1997) pp. 69–72.
Yamamoto, "*Magnetic Properties of Anisotropic Sr–La–System Ferrite Magnets*", IEEE Transactions on Magnetics, vol. 26, No. 3 May 1990 pp. 1144–1148.

(Continued)

Primary Examiner—C. Melissa Koslow
(74) Attorney, Agent, or Firm—Nixon Peabody LLP; Jeffrey L. Costellia

(57) ABSTRACT

A ferrite magnet obtained by adding a ferrite having a spinel-type structure to a ferrite having a hexagonal M-type magnetoplumbite structure, in which a portion of Sr, Ba, Pb or Ca is replaced with at least one element that is selected from the group consisting of the rare-earth elements (including Y) and Bi and that always includes La, during the fine pulverization process thereof. By adding a small amount of the element such as Co, Ni, Mn or Zn to the ferrite already having the hexagonal M-type magnetoplumbite structure during the fine pulverization process thereof, the magnetic properties can be improved.

19 Claims, 5 Drawing Sheets

OTHER PUBLICATIONS

International Search Report dated Apr. 23, 2002.
Patent Abstracts of Japan, JP 56-118304, Watanabe et al., Sep. 17, 1981.
Patent Abstracts of Japan, JP 08-195308, Takeuchi et al., Jul. 30, 1996.
Patent Abstracts of Japan, JP 09-134522, Ishikawa et al., May 20, 1997.
Patent Abstracts of Japan, JP 2000-331813, Kubota et al., Nov. 30, 2000.

* cited by examiner $(1-x)SrO \cdot (x/2)La_2O_3 \cdot nFe_2O_3 + yCoFe_2O_4$
$x=0.2, y=0.1, y/x=0.5, n=5.8$

PERMANENT MAGNET AND METHOD FOR PREPARATION THEREOF

TECHNICAL FIELD

The present invention relates to a ferrite magnet powder, a magnet made of the magnet powder, and methods of making the magnet powder and the magnet.

BACKGROUND ART

Ferrite is a generic term for any compound including an oxide of a divalent cationic metal and trivalent iron, and ferrite magnets have found a wide variety of applications in numerous types of rotating machines, loudspeakers, and so on. Typical materials for a ferrite magnet include Sr ferrites ($SrFe_{12}O_{19}$) and Ba ferrites ($BaFe_{12}O_{19}$) having a hexagonal magnetoplumbite structure. Each of these ferrites is made of iron oxide and a carbonate of strontium (Sr), barium (Ba) or any other suitable element, and can be produced at a relatively low cost by a powder metallurgical process.

A basic composition of an (M-type) ferrite having the magnetoplumbite structure is normally represented by the chemical formula $AO.6Fe_2O_3$, where A is a metal element to be divalent cations and is selected from the group consisting of Sr, Ba, Pb, Ca, and other suitable elements.

It was reported that the magnetization of a Ba ferrite could be increased by substituting Ti or Zn for a portion of Fe (see Journal of the Magnetics Society of Japan Vol. 21, No. 2 (1997), 69–72).

It is also known that the coercivity and magnetization of a Ba ferrite can be increased by substituting a rare-earth element such as La for a portion of Ba and by substituting Co or Zn for a portion of Fe (see Journal of Magnetism and Magnetic Materials, Vols. 31–34 (1983), 793–794 and Bull. Acad. Sci. USSR (Transl.) phys. Sec. Vol. 25 (1961) 1405–1408).

As for an Sr ferrite on the other hand, it was reported that the coercivity and magnetization thereof could be increased by substituting La for a portion of Sr (see IEEE Transaction on Magnetics, Vol. 26, No. 3 (1999), 1144–1148).

It was also reported that the coercivity and magnetization of an Sr ferrite could be increased by substituting La for a portion of Sr and by substituting Co and Zn for a portion of Fe (see PCT International Application No. PCT/JP98/00764 (corresponding to PCT International Publication No. WO 98/38654)).

Furthermore, it was reported that a magnet, including, as its main phase, a hexagonal ferrite such as Ba ferrite or Sr ferrite in which Sr, Ba, Ca, Co, rare-earth elements (including Y), Bi and Fe are contained, may be produced by adding some or all of those constituent elements to particles including, as their main phase, a hexagonal ferrite containing at least Sr, Ba or Ca and then calcining the mixture decisively (see PCT International Application No. PCT/JP98/04243 (corresponding to PCT International Publication No. WO 99/16087)). It was reported that a magnet having at least two Curie temperatures could be obtained and the magnetization, coercivity and variation in coercivity with temperature could be improved according to this method.

As for an Sr ferrite or a Ba ferrite, it was further reported that a high-performance ferrite magnet with excellent magnetic properties (in the loop squareness of its B—H curve among other things) could be obtained at a relatively low cost by substituting La, Ce, Pr, Nd, Sm, Eu or Gd for a portion of Sr or Ba and by substituting Co, Mn or V for a portion of Fe (see Japanese Laid-Open Publication No. 11-307331).

It was further reported that a ferrite magnet, hardly exhibiting any variation in coercivity or magnetization with temperature (i.e., showing slight decrease in magnetization in a high temperature range and little decrease in coercivity in a low temperature range) could be obtained by allowing a ferrite having an M-type magnetoplumbite structure and a ferrite having a spinel-type structure to coexist (see Japanese Laid-Open Publication No. 11-224812).

However, none of these ferrite magnets can improve the magnetic properties sufficiently and reduce the manufacturing cost significantly at the same time. Specifically, it was reported that the ferrite in which Ti or Zn was substituted for a portion of Fe exhibited slightly increased magnetization but significantly decreased coercivity. It was also reported that the ferrite in which La was substituted for a portion of Sr exhibited slightly increased coercivity and magnetization. However, the properties of such a ferrite are still not fully satisfactory. Furthermore, it was reported that the ferrite in which La was substituted for a portion of Ba or a portion of Sr and in which Co or Zn was substituted for a portion of Fe exhibited increased coercivity and magnetization. But if a rare-earth element (such as La) and Co are used in large amounts as substituents for a ferrite, then the material cost of such a ferrite increases adversely because the raw materials of these substituents are expensive. In that case, the essential feature of the ferrite magnet, which should be produced at a lower manufacturing cost than a rare earth magnet, for example, might be lost. Furthermore, the ferrite in which La, Ce, Pr, Nd, Sm, Eu or Gd was substituted for a portion of Sr or a portion of Ba and in which Co, Mn or V was substituted for a portion of Fe exhibited improved loop squareness but decreased magnetization.

On the other hand, as for the ferrite disclosed in Japanese Laid-Open Publication No. 11-224812, in which a ferrite having an M-type magnetoplumbite structure and a ferrite having a spinel-type structure coexist, ferrites representing Examples Nos. 1 to 3 thereof exhibit improved magnetic properties and temperature properties but include relatively large amounts of La and element M such as Mg, Mn, Cu, Fe, Co, Ni and Li to be added to Fe. It is also disclosed in that document that if a ferrite having a composition represented by $Sr_{0.8}La_{0.2}Fe_{11.8}Co_{0.2}O_{19}$ is fired within a mixture of nitrogen and oxygen gases with the partial pressure of oxygen changed, a ferrite representing Example No. 4 thereof can have the structure, in which a ferrite having an M-type magnetoplumbite structure and a ferrite having a spinel-type structure coexist, even without using a reducing atmosphere as the firing atmosphere. In that case, however, good magnetic properties are not achieved. Example No. 5 disclosed therein is a ferrite magnet to be obtained, as in the present invention, by separately preparing $SrFe_{12}O_{19}$ as a ferrite having an M-type magnetoplumbite structure and $CoFe_2O_5$ as a ferrite having a spinel-type structure, mixing these ferrites together during a pulverization process, and then making a sintered body by a normal process. In that case, the temperature coefficient of magnetization is improved but the magnetization and coercivity themselves decrease significantly due to the addition of $CoFe_2O_5$.

In order to overcome the problems described above, a primary object of the present invention is to provide a ferrite magnet that can be produced at a low manufacturing cost and that can still exhibit improved magnetic properties and a method of making such a ferrite magnet.

DISCLOSURE OF INVENTION

This object is achieved by any of the following subject matters (1) through (25):

(1) An oxide magnetic material including a ferrite having a hexagonal M-type magnetoplumbite structure as a main phase, the material comprising:

A, which is at least one element selected from the group consisting of Sr, Ba, Pb and Ca;

R, which is at least one element selected from the group consisting of the rare-earth elements (including Y) and, Bi and which always includes La; and Fe, wherein the ratio of the constituents A, R and Fe of the oxide magnetic material is represented by $$(1-x)\,AO\cdot(x/2)\,R_2O_3\cdot n\,Fe_2O_3, \quad \text{Formula 1}$$

where $0.05 \leq x < 0.3$, and $5.0 \leq n \leq 6.5$, and wherein another oxide magnetic material, including a ferrite having a spinel-type structure as a main phase, is added at 0.2 wt % to 6.2 wt % to the oxide magnet material including the ferrite having the hexagonal M-type magnetoplumbite structure as its main phase, the oxide magnetic material to be added being represented by:

$$MO\cdot Fe_2O_3\;(MFe_2O_4) \quad \text{Formula 2}$$

where M is at least one element selected from the group consisting of Co, Ni, Mn and Zn.

(2) A ferrite magnet powder comprising the oxide magnetic material of (1).

(3) A method of making a ferrite calcined body, the method comprising the steps of:

preparing a material powder mixture by mixing: a material powder of at least one compound that is selected from the group consisting of $SrCO_3$, $BaCO_3$, PbO and $CaCO_3$; an oxide material powder of at least one element to be selected from the group consisting of the rare-earth elements (including Y) and Bi, the oxide material powder always including $La_2O_3$; and a material powder of $Fe_2O_3$;

calcining the material powder mixture at a temperature of 1,100° C. to 1,450° C., thereby forming a ferrite calcined body having an M-type magnetoplumbite structure and a composition represented by the general formula:

$$(1-x)\,AO\cdot(x/2)\,R_2O_3\cdot n\,Fe_2O_3$$

where A is at least one element selected from the group consisting of Sr, Ba, Pb and Ca; R is at least one element selected from the group consisting of the rare-earth elements (including Y) and Bi and always includes La; $0.05 \leq x < 0.3$; and $5.0 \leq n \leq 6.5$ preparing another material powder mixture by mixing an oxide material powder of at least one element selected from the group consisting of Co, Ni, Mn and Zn and a material powder of $Fe_2O_3$;

calcining the material powder mixture at a temperature of 700° C. to 1,450° C., thereby forming a ferrite calcined body having a spinel-type structure and a composition represented by the general formula:

$$MO\cdot Fe_2O_3$$

where M is at least one element selected from the group consisting of Co, Ni, Mn and Zn; and preparing a calcined body by adding the ferrite calcined body having the spinel-type structure at 0.2 wt % to 6.2 wt % to the ferrite calcined body having the M-type magnetoplumbite structure.

(4) A method of making a ferrite calcined body, the method comprising the steps of:

preparing a mixed solution, in which a chloride of at least one element that is selected from the group consisting of Sr, Ba, Pb and Ca, a chloride of at least one element R that is selected from the group consisting of the rare-earth elements (including Y) and Bi and that always includes La, and a chloride of Fe are dissolved and which satisfies pH<6;

calcining the mixed solution by spraying the mixed solution into an atmosphere that has been heated to a temperature of 800° C. to 1,400° C., thereby forming a ferrite calcined body having an M-type magnetoplumbite structure and a composition represented by the general formula:

$$(1-x)AO\cdot(x/2)R_2O_3\cdot n\,Fe_2O_3$$

where A is at least one element selected from the group consisting of Sr, Ba, Pb and Ca; R is at least one element selected from the group consisting of the rare-earth elements (including Y) and Bi and always includes La; $0.05 \leq x < 0.3$; and $5.0 \leq n \leq 6.5$ preparing another material powder mixture by mixing an oxide material powder of at least one element selected from the group consisting of Co, Ni, Mn and Zn and a material powder of $Fe_2O_3$;

calcining the material powder mixture at a temperature of 700° C. to 1,450° C., thereby forming a ferrite calcined body having a spinel-type structure and a composition represented by the general formula:

$$MO\cdot Fe_2O_3$$

where M is at least one element selected from the group consisting of Co, Ni, Mn and Zn; and preparing a calcined body by adding the ferrite calcined body having the spinel-type structure at 0.2 wt % to 6.2 wt % to the ferrite calcined body having the M-type magnetoplumbite structure.

(5) A method of making a ferrite calcined body, the method comprising the steps of:

pulverizing the calcined body, formed by the method of (3) or (4), to obtain a ferrite pulverized powder having a mean particle size of 0.2 μm to 2.0 μm when the size is measured by an air permeability method; and calcining the ferrite pulverized powder again at a temperature of 900° C. to 1,450° C.

(6) The method of one of (3) to (5), wherein the oxide of the element M is partially or fully replaced with a hydroxide of the element M.

(7) The method of one of (3), (5) and (6), wherein a sulfate of the element A or a sulfate of the element R is added to the material powder mixture.

(8) The method of one of (4) to (6), wherein a sulfate of the element A or a sulfate of the element R is added to the mixed solution.

(9) The method of one of (3) to (8), wherein at least one of the step of preparing the material powder mixture, the step of preparing the mixed solution, and the step of pulverizing the ferrite calcined body includes adding $B_2O_3$ and/or $H_3BO_3$.

(10) A method of making a magnet powder comprising the step of pulverizing the calcined body, obtained by the method of one of (3) to (9), such that a mean particle size thereof becomes 0.2 μm to 2.0 μm when measured by an air permeability method.

(11) A method of making a magnet powder, the method comprising the steps of:

preparing a calcined body mixed powder by adding 0.3 wt % to 1.5 wt % of CaO, 0.2 wt % to 1.0 wt % of $SiO_2$, 0 wt % to 5.0 wt % of $Cr_2O_3$, and 0 wt % to 5.0 wt % of $Al_2O_3$ to the calcined body obtained by the method of one of (3) to (9), and pulverizing the calcined body mixed powder to obtain a ferrite pulverized powder having a mean particle size of 0.2 μm to 2.0 μm when the size is measured by an air permeability method.

(12) A magnetic recording medium comprising the ferrite magnet powder of (2).

(13) A magnetic recording medium comprising the magnet powder obtained by the method of (10) or (11).

(14) A bonded magnet comprising the ferrite magnet powder of (2).

(15) A bonded magnet made of the magnet powder obtained by the method of (10) or (11).

(16) A sintered magnet comprising the ferrite magnet powder of (2).

(17) A sintered magnet made of the magnet powder obtained by the method of (10) or (11).

(18) A method for producing a magnet, the method comprising the steps of subjecting the magnet powder, obtained by the method of (10) or (11), to a heat treatment, and making a bonded magnet of the magnet powder that has been subjected to the heat treatment.

(19) The method of (18), wherein the heat treatment is carried out at a temperature of 700° C. to 1,100° C.

(20) A sintered magnet, which is made of the ferrite magnet powder of (2) and which includes CaO, $SiO_2$, $Cr_2O_3$, and $Al_2O_3$ at the percentages of:

0.3 wt % to 1.5 wt % (CaO),
0.2 wt % to 1.0 wt % ($SiO_2$),
0 wt % to 5.0 wt % ($Cr_2O_3$), and
0 wt % to 5.0 wt % ($Al_2O_3$), respectively.

(21) A method for producing a sintered magnet, the method comprising the steps of preparing a magnet powder by the method of (10) or (11), and condensing, mulling, compacting and sintering the magnet powder, where the magnet powder is compacted with or without a magnetic field applied thereto.

(22) A method for producing a sintered magnet, the method comprising the steps of preparing a magnet powder by the method of (10) or (11), and condensing, mulling, drying, crushing, compacting and sintering the magnet powder, where the magnet powder is compacted with or without a magnetic field applied thereto.

(23) The method of (21) or (22), wherein the step of pulverizing or the step of mulling includes the step of adding a dispersant at a solid matter ratio of 0.2 wt % to 2.0 wt %.

(24) A rotating machine comprising the magnet of one of (14) to (17) and (20).

(25) A magnetic recording medium comprising a thin-film magnetic layer that includes the oxide magnetic material of (1).

BEST MODE FOR CARRYING OUT THE INVENTION

Figure 1:
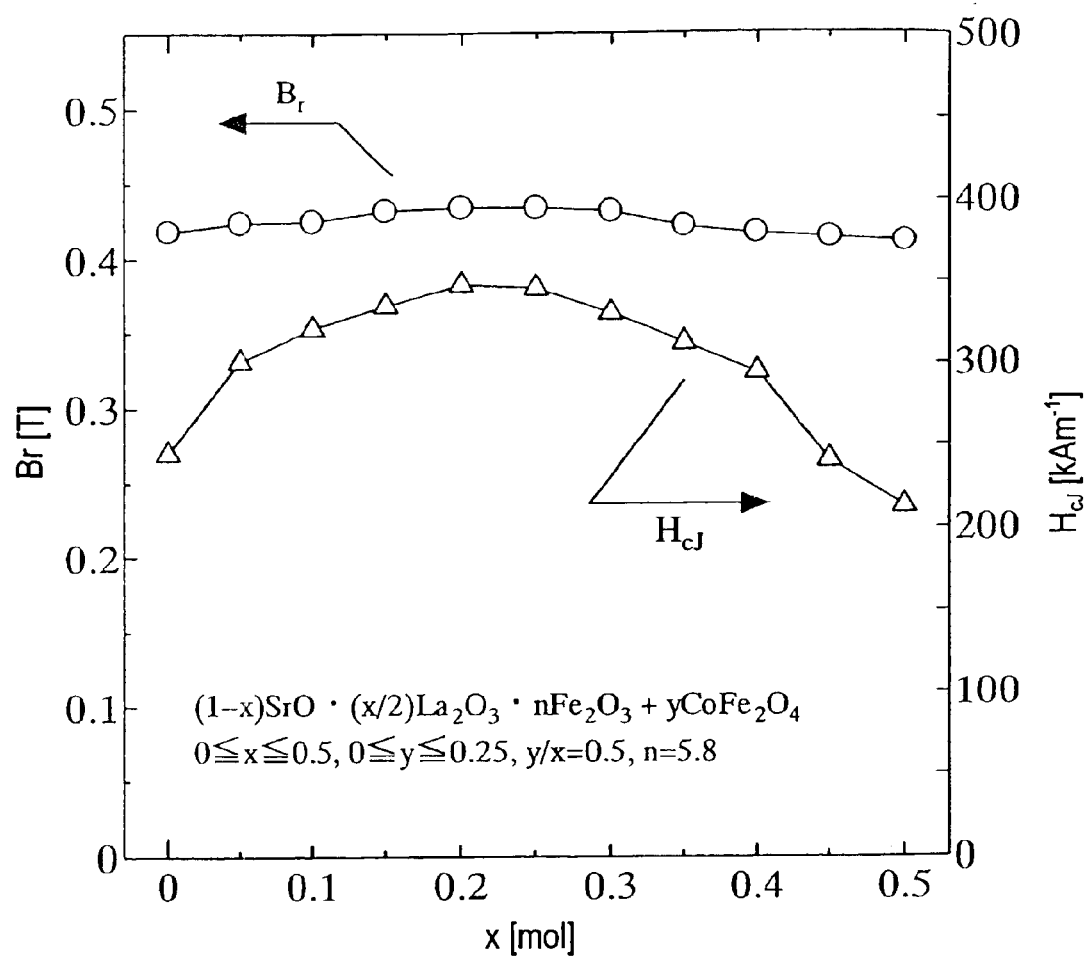
FIG. 1 is a graph showing a relationship between the mole fraction x and the remanence $B_r$ and a relationship between the mole fraction x and the coercivity $H_{cJ}$ in a sintered magnet according to the present invention, which is represented by $(1-x)$ $SrO.(x/2)$ $La_2O_3.n$ $Fe_2O_3+y$ $CoFe_2O_4$ (where $0 \leq x \leq 0.5$, $0 \leq y \leq 0.25$, y/x=0.5 and n=5.8).

Hereinafter, embodiments of the present invention will be described with reference to the accompanying drawings.

According to the present invention, element R (which is at least one element selected from the group consisting of the rare-earth elements (including Y) and Bi and which always includes La) is substituted for a portion of element A in a ferrite having a hexagonal M-type magnetoplumbite structure $AO.6Fe_2O_3$ (where A is at least one element selected from the group consisting of Sr, Ba, Pb and Ca) and a ferrite having a spinel-type structure $MO.Fe_2O_3$, where element M is at least one element selected from the group consisting of Co, Ni, Mn and Zn, is added to the ferrite having the hexagonal M-type magnetoplumbite structure.

In the prior art, it was believed that when divalent ions of Co, Zn or other suitable element are substituted for a portion of Fe and when trivalent ions of La or other suitable element are substituted for a portion of Ba or Sr, these substitutions may be carried out separately but are preferably carried out simultaneously in view of charge compensation. It was also believed that these substitutions should be done by both substituents at a predetermined ratio to achieve the charge compensation.

However, as opposed to such a misconception prevalent in the pertinent art, the present inventors initially produced a state in which the charge compensation was achieved only incompletely, i.e., just substituted element R for a portion of element A to obtain a ferrite with a hexagonal M-type magnetoplumbite structure in which no heterogeneous phases such as ortho-ferrite ($RFeO_3$) or hematite ($\alpha$-$Fe_2O_3$) were created, and then added a ferrite having a spinel-type structure, including element M, to such a ferrite. The present inventors discovered that similar effects were also achieved, and yet the amount of the element M to be added could be reduced significantly, compared to the conventional method with the charge compensation, to acquire the basic idea of the present invention.

It should be noted that even though the charge compensation is not the issue, the respective substituents still need to be added at the best ratio because the magnetic properties might deteriorate depending on the ratios defined for those elements. Thus, according to the present invention, the respective substituents are added in predetermined amounts and the manufacturing process, composition and additives are optimized to add them at the best ratio. In this manner, the present inventors improved the magnetic properties successfully.

Also, compared to the conventional method in which element R is substituted for a portion of element A and element M is substituted for a portion of Fe simultaneously or a situation where none of these substitutions is done, the ferrite calcined body has a decreased crystal grain size in the oxide magnetic material of the present invention where just the substitution of element R for a portion of element A is done, which is one of the features of the present invention. For example, if the calcining process is carried out at 1,300° C., the resultant ferrite calcined body will have an average crystal grain size of 10 $\mu$m or more in the conventional method. In contrast, the method of the present invention results in an average crystal grain size of several $\mu$m. In this manner, since the crystal grain size does not increase excessively, various inconveniences can be avoided (e.g., it will not take too much time to complete the subsequent pulverizing process). In addition, it is also possible to control the crystal grain size of the ferrite calcined body such that even when the ferrite calcined body is used as a ferrite magnet powder, there is almost no need, or even absolutely no need, to pulverize the ferrite calcined body.

The oxide magnetic material of the present invention is a ferrite to be obtained by adding a ferrite having a spinel-type structure, which is represented by:

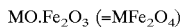

$$MO \cdot Fe_2O_3 \ (=MFe_2O_4) \quad \text{Formula 2}$$

to a ferrite having a substantially M-type magnetoplumbite structure, which is represented by:

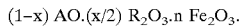

$$(1-x) \, AO \cdot (x/2) \, R_2O_3 \cdot n \, Fe_2O_3. \quad \text{Formula 1}$$

The oxide magnetic material of the present invention may be provided as any of various forms including a calcined body, a magnet powder, a bonded magnet, a sintered magnet and a magnetic recording medium.

When Sr is selected as the element A, the magnetic properties are improved more significantly than the situation where Ba, Pb or Ca is selected as the element A. For that reason, Sr is preferably selected as the element A as an indispensable component. Depending on the specific application, however, it may be more advantageous to select Ba, for example, to reduce the cost.

The magnetic properties are improved most significantly when La is selected as the element R. Thus, only La is preferably selected as the element R. Depending on the specific application, however, it may be advantageous to add La as an indispensable element and at least one of the rare-earth elements (including Y) and Bi as an optional element to reduce the cost.

As described above, the element M is at least one element selected from the group consisting of Co, Ni, Mn and Zn. When Zn is selected as the element M, the saturation magnetization increases. On the other hand, when Co, Ni or Mn is selected as the element M, the anisotropic magnetic field increases. Particularly when Co is selected, the anisotropic magnetic field increases significantly. The anisotropic magnetic field represents a theoretical upper limit of coercivity. Thus, to increase the coercivity, it is important to increase the anisotropic magnetic field.

In the Formula 1, x and n represent mole fractions and satisfy the inequalities $0.05 \leq x < 0.3$ and $5.0 \leq n \leq 6.5$, respectively. A preferable range of x is $0.05 \leq x < 0.3$ and a more preferable range thereof is $0.05 \leq x \leq 0.25$. On the other hand, a preferable range of n is $5.5 \leq n \leq 6.5$ and a more preferable range thereof is $5.8 \leq n \leq 6.3$.

In the Formula 1, if x is way below the range specified above, then just a small percentage of the element A is replaced with the element R, thus improving the magnetic properties only slightly. However, if x is way beyond that range, then the magnetic properties will deteriorate and the cost will increase. In addition, heterogeneous phases such as ortho-ferrite and hematite are created while the ferrite represented by Formula 1 is being produced, and the grain growth of those phases may be caused during the second calcining process and/or the heat treatment by sintering, thus further deteriorating the magnetic properties.

On the other hand, if n is too small, non-magnetic phases, including the element A, increase. But if n is too large, hematite and other phases increase to deteriorate the magnetic properties.

The spinel-structure ferrite as represented by Formula 2 to be added to the M-type magnetoplumbite ferrite as represented by Formula 1 is preferably 0.2 wt % to 6.2 wt %, more preferably 0.2 wt % to 4.8 wt %, and even more preferably 0.3 wt % to 4.1 wt %.

If the spinel-structure ferrite is added in too a small amount, then the effects to be achieved by the addition are not so dramatic as to improve the magnetic properties sufficiently. However, if the amount of the ferrite added is excessive, then the magnetic properties will deteriorate and the cost will rise as well.

Furthermore, if y/x (where y is a mole fraction corresponding to the amount of element M in the spinel-structure ferrite to be added to one mole of the M-type magnetoplumbite ferrite as represented by Formula 1) is too low, then the effects to be achieved by the addition are not so dramatic as to improve the magnetic properties sufficiently. However, if y/x is too high, then the magnetic properties will deteriorate and the cost will rise as well. Thus, y/x preferably satisfies $0.2 \leq y/x \leq 1.0$ and more preferably satisfies $0.3 \leq y/x \leq 0.8$.

Hereinafter, an exemplary method of making a magnet powder according to the present invention will be described.

First, a powder of $SrCO_3$, $BaCO_3$, PbO or $CaCO_3$ is mixed with a powder of $Fe_2O_3$ at a mole ratio of $(1-0.05)$: 5.0 to $(1-0.3)$: 6.5. In this process step, a material powder of at least one oxide, which is selected from the group consisting of oxides of the rare-earth elements (including Y) and $Bi_2O_3$ and which always includes $La_2O_3$, is added to the material powder.

In this manner, the rare-earth elements including Y and/or Bi may be added as their oxide powders. Alternatively, powders or solutions of compounds (e.g., carbonates, hydroxides, nitrates and chlorides) that will be oxides in a subsequent calcining process may also be added. As another alternative, a compound, which is made up of at least two elements to be selected from the group consisting of Sr, Ba, Pb, Ca, the rare-earth elements (including Y), Bi and Fe, may also be added.

If necessary, a boron compound (such as $B_2O_3$ or $H_3BO_3$) may be added to the powder. Also, a sulfate of at least one element, which is selected from the group consisting of Sr, Ba, Pb, Ca, Y, the rare-earth elements, Bi and Fe, may be used as a portion of the material powder. By using any of these additives, the reactivity to the ferrite phase with the M-type magnetoplumbite structure during the calcining process can be improved and the grain growth can be minimized, thus improving the magnetic properties. These effects are achieved particularly noticeably when the Formula 1 satisfies n>6, in which range it was believed that no single-phase ferrite with the M-type magnetoplumbite structure could be obtained and no good magnetic properties should be achievable.

If necessary, about 3 wt % of another compound such as $BaCl_2$ may be added to the powder.

If necessary, at most about 3 wt % of any other compound (e.g., a compound including Si, Ca, Pb, Al, Ga, Cr, Sn, In, Co, Ni, Ti, Mn, Cu, Ge, V, Nb, Zr, Li, Mo, Bi and/or a rare-earth element (including Y)) may be added to the material powder mixture. Also, the material powder mixture may further include very small amounts of impurities such as inevitable components.

It should be noted that the process step of preparing a material powder mixture herein refers to not only a situation where such a material powder mixture is prepared from the beginning but also a situation where a material powder mixture, prepared by somebody else, is purchased and used and a situation where a material powder made by somebody else is added to the mixture.

Next, the material powder mixture is heated to a temperature of 1,100° C. to 1,450° C. by using a batch furnace, a continuous furnace, or a rotary kiln, for example, thereby producing a ferrite compound having an M-type magnetoplumbite structure through a solid-phase reaction. This process will be referred to herein as "calcining" and a compound obtained by this process will be referred to herein as a "calcined body". The calcining process may be carried out for a period of time of about 1 second to about 10 hours, preferably from 0.5 hour to 3 hours. In the calcining process, as the temperature rises, a ferrite phase is gradually formed through the solid phase reaction. The formation of the ferrite phase is completed at about 1,100° C. If the calcining process is finished at a temperature lower than about 1,100° C., then unreacted hematite will be left to deteriorate the resultant magnet properties. The effects of the present invention are achieved if the calcining temperature exceeds 1,100° C. However, the effects of the present invention are relatively modest if the calcining temperature is in the range of 1,100° C. to 1,150° C., but increases as the calcining temperature exceeds this range. However, if the calcining temperature is higher than 1,350° C., then various inconveniences might be created. For example, crystal grains might grow so much that it would take a lot of time to pulverize the powder in the subsequent pulverizing process step. In view of these considerations, the calcining temperature is preferably in the range of 1,150° C. to 1,350° C.

Alternatively, the calcined body of a ferrite having the M-type magnetoplumbite structure according to the present invention can also be obtained by a spray pyrolysis process, in which a mixed solution, where the material components are dissolved, is sprayed into, and calcined by, a heated atmosphere. In that case, the mixed solution may be prepared by dissolving a chloride of at least one element selected from the group consisting of Sr, Ba, Pb and Ca, a chloride of at least one element that is selected from the group consisting of the rare-earth elements including Y and Bi and that always includes La, and a chloride of Fe.

Hereinafter, an exemplary method of preparing a powder of the ferrite calcined body by the spray pyrolysis process will be described.

First, solutions of strontium chloride and ferrous chloride are mixed together such that the two elements Sr and Fe satisfy a mole ratio of (1−0.05):10.0 to (1−0.3):13.0. In this process step, a chloride solution of La is added to the mixture to prepare a spray solution.

Specifically, the spray solution may be obtained by preparing and mixing together chloride solutions of the following groups of material elements:

1. Carbonates, sulfates, nitrates, chlorides or oxides of at least one element to be selected from the group consisting of Sr, Ba, Pb and Ca; and
2. Carbonates, sulfates, nitrates, chlorides or oxides of at least one element that is selected from the group consisting of the rare-earth elements (including Y) and Bi and that always includes La.

The spray solution may be prepared by mixing together the chloride solutions of the respective material elements as described above. Alternatively, it is also efficient to prepare the spray solution by directly dissolving the material compounds in the ferrous chloride solution.

As the ferrous chloride solution, a waste produced by acid cleaning of a steel plate, for example, in a rolling process at an ironworks may be used.

If necessary, about 0.3 wt % of another compound including a boron compound such as $B_2O_3$ or $H_3BO_3$ and at most about 3 wt % of any other compound (e.g., a compound including Si, Ca, Pb, Al, Ga, Cr, Sn, In, Co, Ni, Ti, Mn, Cu, Ge, V, Nb, Zr, Li, Mo, Bi or a rare-earth element (including Y)) may be added to the spray solution. Also, the spray solution may further include very small amounts of impurities such as inevitable components.

The spray solution prepared is sprayed into an atmosphere that has been heated to a temperature of 800° C. to 1,400° C. with a roasting furnace, for example, thereby drying and calcining the solution simultaneously and forming a ferrite calcined body having an M-type magnetoplumbite structure. If the temperature of the heated atmosphere is too low, then unreacted hematite and so on may be left. However, if the temperature is too high, then magnetite may be produced or the composition of the resultant ferrite calcined body likely varies. Thus, the temperature of the heated atmosphere is preferably 900° C. to 1,300° C., more preferably 1,000° C. to 1,200° C.

The spray solution may be calcined with a hydrochloric acid collector at an ironworks. Then, a calcined body can be obtained efficiently by the spray pyrolysis process.

The calcined body obtained by these calcining processes is a ferrite which is represented by (1−x) AO.(x/2) $R_2O_3$.n $Fe_2O_3$ (where A is at least one element selected from the group consisting of Sr, Ba, Pb and Ca and R is at least one element selected from the group consisting of the rare-earth elements (including Y) and Bi and always includes La) and which has a substantially M-type magnetoplumbite structure.

Hereinafter, a method of making the spinel-type structure ferrite to be added to this calcined body will be described. First, an oxide powder of at least one element M to be selected from the group consisting of Co, Ni, Mn and Zn and a powder of $Fe_2O_3$ are mixed together at a mole ratio of approximately 1:1.

In this manner, the element M may be added as its oxide powder. Alternatively, powders or solutions of compounds (e.g., carbonates, hydroxides, nitrates and chlorides) that will be oxides in a subsequent calcining process may also be added. As another alternative, a compound, which is made up of at least two elements to be selected from the group consisting of Sr, Ba, Pb, Ca, Co, Ni, Mn, Zn and Fe, may also be added.

The oxide of the element M described above may be partially or fully replaced with a hydroxide of the element M. Some of these hydroxides are believed to be hydrated oxides or oxidized hydroxides of the element M. For example, when the element M is Co, cobalt hydroxides such as $Co(OH)_2$ and/or $Co(OH)_3$ may be used as hydroxides of the element M. It should be noted that $Co(OH)_3$ is believed to be a hydrated oxide of Co. Particularly when a cobalt hydroxide is used, the magnetic properties can be improved significantly. These effects are achieved particularly noticeably when the Formula 1 satisfies n>6, in which range it was believed that no single-phase ferrite with the M-type magnetoplumbite structure could be obtained and no good magnetic properties should be achievable.

If necessary, about 1 wt % of another compound, including a boron compound (such as $B_2O_3$ or $H_3BO_3$), and about 3 wt % of yet another compound such as $BaCl_2$ may be added to the powder.

If necessary, at most about 3 wt % of any other compound (e.g., a compound including Si, Ca, Pb, Al, Ga, Cr, Sn, In, Co, Ni, Ti, Mn, Cu, Ge, V, Nb, Zr, Li, Mo, Bi and/or a rare-earth element (including Y)) may be added to the material powder mixture. Also, the material powder mixture may further include very small amounts of impurities such as inevitable components.

Next, the material powder mixture is calcined at a temperature of 700° C. to 1,450° C. with a batch furnace, a continuous furnace, or a rotary kiln, for example, thereby obtaining a spinel-type structure ferrite calcined body.

By adding the spinel-type structure ferrite to the M-type magnetoplumbite ferrite calcined body and then subjecting the calcined body to the pulverization process step of pulverizing and/or crushing it, a ferrite magnet powder according to this embodiment can be obtained. The mean particle size thereof is preferably 2.0 $\mu$m or less, more preferably 0.2 $\mu$m to 1 $\mu$m. An even more preferable range of the mean particle size is 0.4 $\mu$m to 0.9 $\mu$m. These mean particle sizes were measured by an air permeability method.

To obtain a more uniform ferrite magnet powder, the resultant ferrite magnet powder may be re-calcined and further pulverized and/or crushed.

Since the respective ferrite structures have already been produced by the first-stage calcining process, the calcining temperature of the second-stage calcining process may be lower than that of the first-stage calcining process. Thus, the second-stage calcining process may be carried out within a temperature range of 900° C. to 1,450° C. To minimize the growth of crystal grains, the second-stage calcining temperature is preferably 900° C. to 1,200° C. The calcining time may range from about 1 second to about 10 hours, preferably 0.5 hour to 3 hours.

It should be noted that a bonded magnet may also be obtained by compounding the ferrite magnet powder with any of various types of binders such as a rubber with some flexibility or a hard and lightweight plastic after subjecting the magnet powder to a heat treatment. In that case, the magnet powder of the present invention is mulled with such a binder and then the mixture is compacted. During the mulling process, any of various known dispersants and surfactants is preferably added at a solid matter ratio of 0.2 wt % to 2.0 wt %. The compaction process is carried out by a method such as injection molding, extrusion molding or roll molding with or without a magnetic field applied thereto.

The heat treatment is carried out to remove the crystal strain that has been caused in the particles of the calcined body during the pulverization process of the calcined body. By conducting the heat treatment at a temperature of 700° C. or more, the crystal strain in the particles of the calcined body is relaxed and the coercivity is recovered. However, if the heat treatment is carried out at a temperature of 1,100° C. or more, then the grains of the powder start to grow and the coercivity decreases. On the other hand, the magnetization increases along with the coercivity up to a temperature of 1,000° C. However, once this temperature is exceeded, the degree of alignment decreases, so does the magnetization. This is probably because the powder particles should be fused with each other. In view of these considerations, the heat treatment is preferably carried out at a temperature of 700° C. to 1,100° C. for 1 second to 3 hours. A more preferable range of the heat treatment temperature is 900° C. to 1,000° C.

It should be noted that if the ferrite magnet powder is heat-treated, mulled with any of various known binders and then applied, an applied magnetic recording medium can be obtained.

Hereinafter, a method for producing a ferrite magnet according to the present invention will be described.

First, an M-type magnetoplumbite ferrite calcined body and a spinel-type structure ferrite calcined body are prepared by the method described above. Next, the spinel-type structure ferrite calcined body is added to the M-type magnetoplumbite ferrite calcined body. Thereafter, the calcined body is subjected to a fine pulverization process using a vibrating mill, a ball mill and/or an attritor so as to be pulverized into fine powder particles having a mean particle size of 0.4 $\mu$m to 0.9 $\mu$m as measured by the air permeability method. The fine pulverization process is preferably carried out as a combination of dry pulverization (i.e., coarse pulverization to a size of greater than 1 $\mu$m) and wet pulverization (i.e., fine pulverization to a size of 1 $\mu$m or less).

To obtain a more uniform ferrite magnet powder, the resultant ferrite magnet powder may be re-calcined and further pulverized and/or crushed at this point in time.

In the fine pulverization process, to improve the magnetic properties, CaO, $SiO_2$, $Cr_2O_3$ and $Al_2O_3$ (specifically, 0.3 wt % to 1.5 wt % of CaO, 0.2 wt % to 1.0 wt % of $SiO_2$, 0 wt % to 5.0 wt % of $Cr_2O_3$ and 0 wt % to 5.0 wt % of $Al_2O_3$) may be added to the calcined body.

The wet pulverization process may be carried out with an aqueous solvent such as water or any of various non-aqueous solvents. As a result of the wet pulverization process, slurry is produced as a mixture of the solvent and the powder of the calcined body. Any of various known dispersants or surfactants is preferably added to the slurry at a solid matter ratio of 0.2 wt % to 2.0 wt %. During this fine pulverization process, about 1 wt % or less of another compound including $Bi_2O_3$, for example, may also be added.

Thereafter, in a wet compaction process, the slurry is compacted with or without a magnetic field applied thereto, while the solvent is removed from the slurry. Alternatively, in a dry compaction process, the slurry may be subjected to drying, crushing and other process steps, and then compacted with or without a magnetic field applied thereto. After the compaction process, the compact is subjected to various known manufacturing processing steps including degreasing, sintering, finishing, cleaning and testing to obtain a ferrite magnet as a final product. The sintering process may be carried out in the air at a temperature of 1,100° C. to 1,250° C. for 0.5 hour to 2 hours, for example. The sintered magnet to be obtained by the sintering process may have a mean particle size of 0.5 $\mu$m to 2.0 $\mu$m, for example.

A rotating machine according to the present invention is characterized by including a ferrite magnet produced by the method described above. Thus, the specific structure thereof may be the same as that of a known rotating machine.

Also, a thin-film magnetic layer for use in a magnetic recording medium according to the present invention is preferably formed by a sputtering process. The ferrite magnet described above may be used as a target for the sputtering process. Alternatively, oxides of respective elements may also be used as targets. By subjecting the thin film; formed by the sputtering process, to a heat treatment, a thin-film magnetic layer of ferrite according to the present invention can be obtained.

A method for producing a ferrite magnet according to the present invention is characterized by preparing a magnetic body including, as a main phase, a ferrite having an M-type magnetoplumbite structure and represented by $(1-x)$ AO.$(x/2)$ $R_2O_3$.n $Fe_2O_3$ (where A is at least one element selected from the group consisting of Sr, Ba, Pb and Ca and R is at least one element selected from the group consisting of the rare-earth elements (including Y) and Bi and always includes La) and then adding a spinel-type structure ferrite thereto during a fine pulverization process. Thus, even if the ferrite having the M-type magnetoplumbite structure is a mother material with a constant composition, a ferrite magnet, exhibiting any desired combination of magnetic properties that fall somewhere within a broad range, can be easily obtained by appropriately changing the amounts of the additives during the fine pulverization process. Thus, the present invention is very effectively applicable for use in a manufacturing process of producing ferrite magnets with a wide variety of magnetic properties.

EXAMPLE 1

First, various material powders, including an $SrCO_3$ powder, an $La_2O_3$ powder and an $Fe_2O_3$ powder, were mixed together such that a composition $(1-x)$ SrO.$(x/2)$ $La_2O_3$.n $Fe_2O_3$ would satisfy $x=0.2$ and $n=5.8$. The resultant material powder mixture was pulverized with a wet ball mill for four hours, dried, and then sieved. Thereafter, the powder was calcined in the air at 1,300° C. for three hours, thereby obtaining a calcined body magnet powder.

The calcined body magnet powder was analyzed by an X-ray diffraction method. As a result, an M-type ferrite single phase was identified but no ortho-ferrite phases or hematite phases were identifiable.

Meanwhile, various material powders, including an $Fe_2O_3$ powder and a CoO powder, an NiO powder, an $Mn_3O_4$ powder or ZnO powder, were mixed together to satisfy a composition CoO.$Fe_2O_3$ (Co—S), NiO.$Fe_2O_3$ (Ni—S), MnO.$Fe_2O_3$ (Mn—S) or ZnO.$Fe_2O_3$ (Zn—S). The resultant material powder mixture was pulverized with a wet ball mill for four hours, dried, and then sieved. Thereafter, the powder was calcined in the air at 850° C. for three hours, thereby obtaining a spinel ferrite calcined body magnet powder.

The spinel ferrite calcined body powder was analyzed by an X-ray diffraction method. As a result, a spinel-type ferrite single phase was identified.

Next, 2.3 wt % of Co—S calcined body magnet powder (Sample No. 1), 2.3 wt % of Ni—S calcined body magnet powder (Sample No. 2), 2.2 wt % of Mn—S calcined body magnet powder (Sample No. 3), 2.5 wt % of Zn—S calcined body magnet powder (Sample No. 4), 1.1 wt % of Co—S calcined body magnet powder and 1.1 wt % of Ni—S calcined body magnet powder (Sample No. 5), 1.1 wt % of Co—S calcined body magnet powder and 1.1 wt % of Mn—S calcined body magnet powder (Sample No. 6), or 1.1 wt % of Co—S calcined body magnet powder and 1.2 wt % of Zn—S calcined body magnet powder (Sample No. 7) was added to the M-type ferrite calcined body magnet powder such that the equivalent mole fraction y of the element M in the spinel ferrite calcined body powder to be added to one mole of the M-type ferrite calcined body magnet powder satisfied $y=0.1$ (i.e., $y/x=0.5$).

Also, 0.7 wt % of $CaCO_3$ powder and 0.4 wt % of $SiO_2$ powder were further added thereto. Then, using water as a solvent, the mixture was finely pulverized with a wet ball mill to a mean particle size of about 0.55 μm as measured by the air permeability method.

Thereafter, with the solvent removed from the finely pulverized slurry, the slurry was compacted under a magnetic field. The compact was sintered in the air at 1,200° C. for 30 minutes to obtain a sintered magnet.

As a comparative example, a sample to which no spinel ferrite calcined body powder was added (Comparative Example No. 1) was also prepared. 0.7 wt % of $CaCO_3$ powder and 0.4 wt % of $SiO_2$ powder were further added thereto. Then, using water as a solvent, the mixture was finely pulverized with a wet ball mill to a mean particle size of about 0.55 μm as measured by the air permeability method. Thereafter, with the solvent removed from the finely pulverized slurry, the slurry was compacted under a magnetic field. The compact was sintered in the air at 1,200° C. for 30 minutes to obtain a sintered magnet. Meanwhile, another sintered magnet that satisfied $n=5.8$ in the composition SrO.n $Fe_2O_3$ was also prepared as Comparative Example No. 2 by the same method as that described above.

The saturation magnetization ($J_s$), remanence ($B_r$) and coercivity ($H_{cJ}$) of the resultant sintered magnets were measured. The results of measurement are shown in the following Table 1. As can be clearly seen from Table 1, Samples Nos. 1 through 7, representing examples of the present invention, exhibited improved magnetic properties as compared with Comparative Example No. 1 or 2.

TABLE 1

| Sample | $J_s$ (T) | $B_r$ (T) | $H_{cJ}$ (kA/m) |
|---|---|---|---|
| 1 | 0.447 | 0.434 | 348 |
| 2 | 0.442 | 0.430 | 327 |
| 3 | 0.446 | 0.431 | 335 |
| 4 | 0.460 | 0.444 | 234 |
| 5 | 0.444 | 0.431 | 334 |
| 6 | 0.446 | 0.433 | 341 |
| 7 | 0.455 | 0.440 | 256 |
| Cmp. Exp. 1 | 0.451 | 0.437 | 251 |
| Cmp. Exp. 2 | 0.431 | 0.418 | 245 |

EXAMPLE 2

First, as in the first example described above, an M-type calcined body magnet powder and a Co—S calcined body magnet powder were prepared so as to satisfy $0 \leq x \leq 0.5$ and $n=5.8$ in a composition $(1-x)$ SrO.$(x/2)$ $La_2O_3$.n $Fe_2O_3$.

The Co—S calcined body powder was added to the M-type ferrite calcined body magnet powder such that the mole fraction y of Co in the Co—S calcined body powder to be added to one mole of the M-type ferrite calcined body magnet powder satisfied $0 \leq y \leq 0.25$ (i.e., $y/x=0.5$). After that, a sintered body was obtained as in the first example described above.

$B_r$ and $H_{cJ}$ of the resultant sintered magnet were measured. The results of measurement are shown in FIG. 1. As can be clearly seen from FIG. 1, $B_r$ and $H_{cJ}$ increased in a range where $0.05 \leq x \leq 0.3$ was satisfied.

The magnetic properties were also tested as in the method described above with Ni—S calcined body magnet powder, Mn—S calcined body magnet powder or Zn—S calcined body magnet powder added. As a result, in the range of $0.05 \leq x \leq 0.3$, $B_r$ and $H_{cJ}$ increased when the Ni—S or Mn—S calcined body magnet powder was added and $B_r$ increased when the Zn—S calcined body magnet powder was added.

EXAMPLE 3

First, as in the first example described above, an M-type ferrite calcined body magnet powder and a Co—S calcined body magnet powder were prepared so as to satisfy x=0.2 and n=5.8 in a composition $(1-x)$ $SrO.(x/2)$ $La_2O_3.n$ $Fe_2O_3$.

The Co—S calcined body powder was added to the M-type ferrite calcined body magnet powder such that the mole fraction y of Co in the Co—S calcined body powder to be added to one mole of the M-type ferrite calcined body magnet powder satisfied $0 \leq y \leq 0.22$ (i.e., $0 \leq y/x \leq 1.1$). After that, a sintered body was obtained as in the first example described above.

Figure 2:
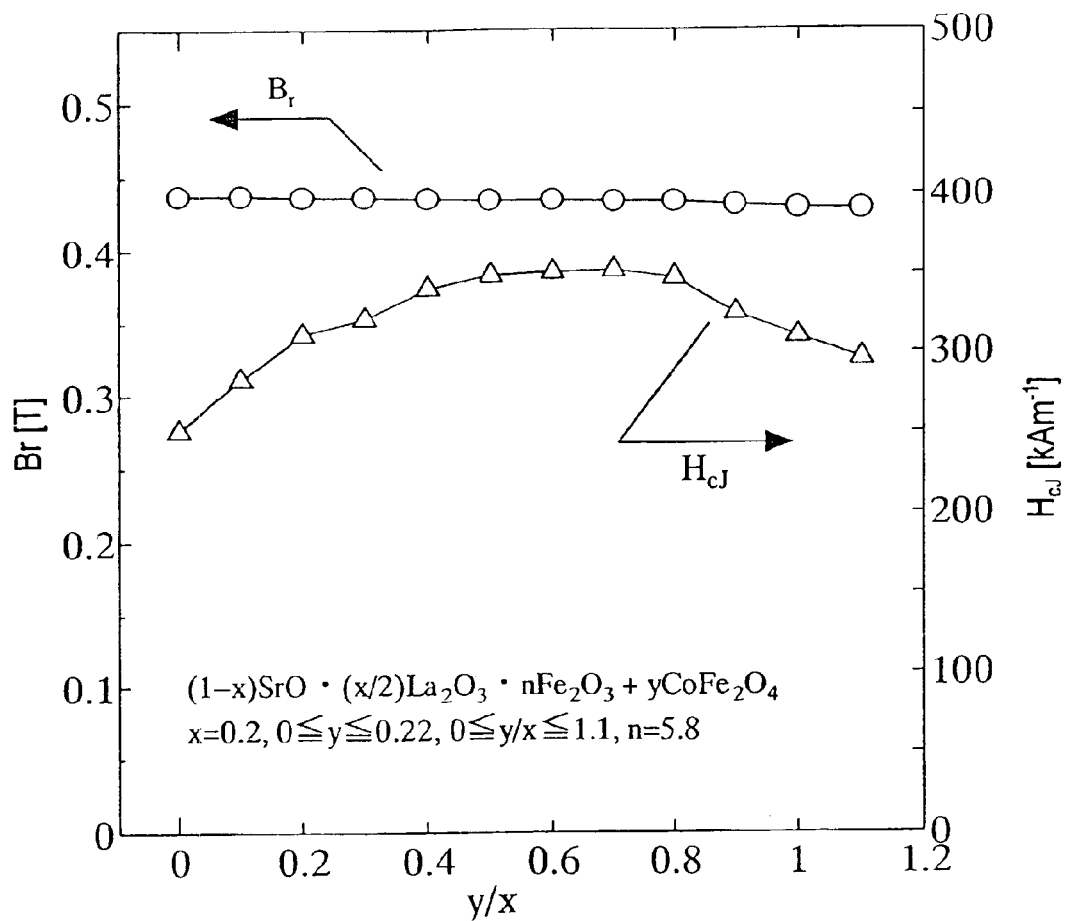
FIG. 2 is a graph showing a relationship between the mole ratio y/x and the remanence $B_r$ and a relationship between the mole ratio y/x and the coercivity $H_{cJ}$ in a sintered magnet according to the present invention, which is represented by $(1-x)$ $SrO.(x/2)$ $La_2O_3.n$ $Fe_2O_3+y$ $CoFe_2O_4$ (where x=0.2, $0 \leq y \leq 0.22$, $0 \leq y/x \leq 1.1$ and n=5.8).

$B_r$ and $H_{cJ}$ of the resultant sintered magnet were measured. The results of measurement are shown in FIG. 2. As can be clearly seen from FIG. 2, $H_{cJ}$ increased in a range where $0.2 \leq y/x \leq 0.8$ was satisfied.

The magnetic properties were also tested as in the method described above with Ni—S calcined body magnet powder, Mn—S calcined body magnet powder or Zn—S calcined body magnet powder added. Consequently, when the Ni—S or Mn—S calcined body magnet powder was added, the results in the same y/x range were similar to the situation where the Co—S calcined body powder was added. On the other hand, when the Zn—S calcined body magnet powder was added, increase in $B_r$ was detected in the same y/x range.

EXAMPLE 4

A calcined body magnet powder was prepared as in the first example described above except that respective materials were mixed together so as to satisfy x=0.2 and $4.6 \leq n \leq 7.0$ in the composition $(1-x)$ $SrO.(x/2)$ $La_2O_3.n$ $Fe_2O_3$. Then, a sintered body was made of the calcined body magnet powder as in Sample No. 1 of the first example.

Figure 3:
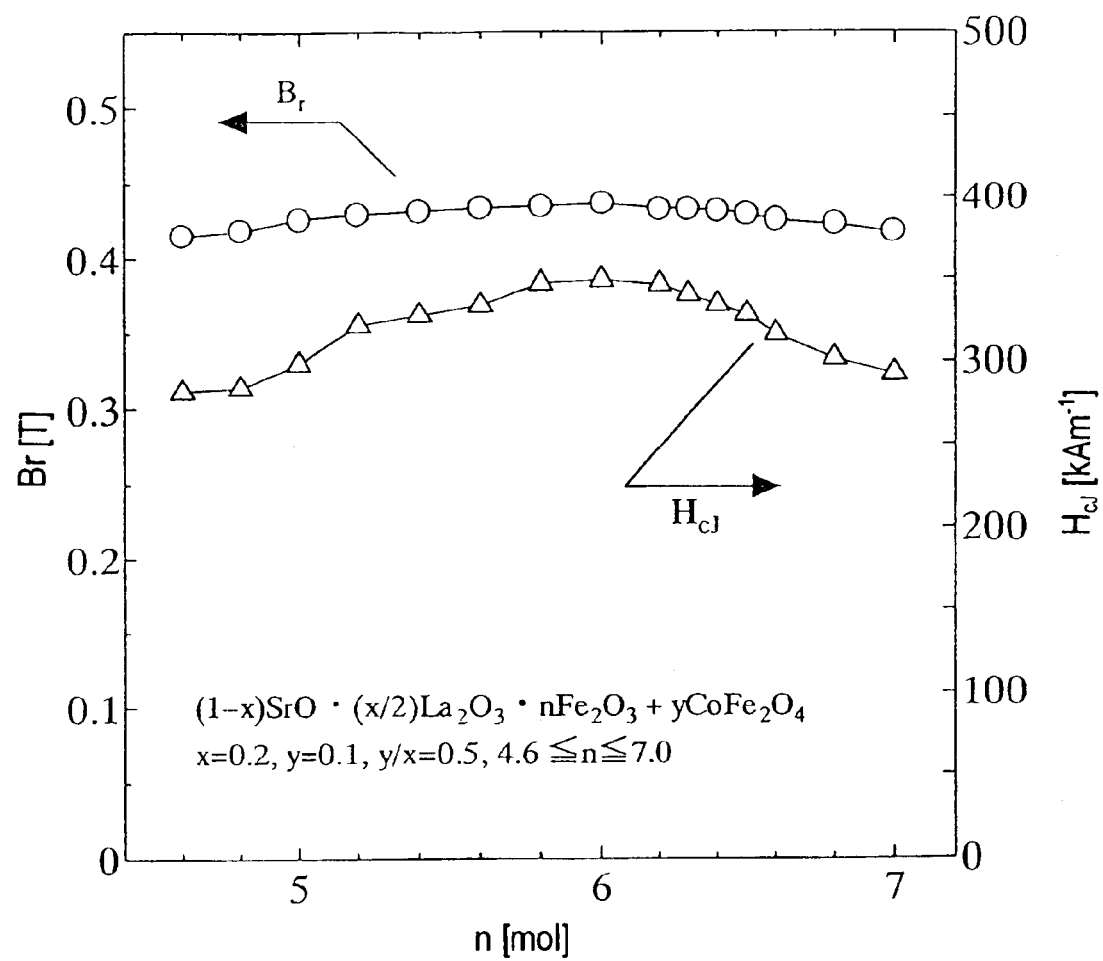
FIG. 3 is a graph showing a relationship between the mole fraction n and the remanence $B_r$ and a relationship between the mole fraction n and the coercivity $H_{cJ}$ in a sintered magnet according to the present invention, which is represented by $(1-x)$ $SrO.(x/2)$ $La_2O_3.n$ $Fe_2O_3+y$ $CoFe_2O_4$ (where x=0.2, y=0.1, y/x=0.5 and $4.6 \leq n \leq 7.0$).

$B_r$ and $H_{cJ}$ of the resultant sintered magnet were measured. The results of measurement are shown in FIG. 3. As can be clearly seen from FIG. 3, $B_r$ and $H_{cJ}$ increased in a range where $5.0 \leq n \leq 6.5$ was satisfied.

The magnetic properties were also tested as in the method described above with Ni—S calcined body magnet powder, Mn—S calcined body magnet powder or Zn—S calcined body magnet powder added. Consequently, when the Ni—S or Mn—S calcined body magnet powder was added, the results in the same n range were similar to the situation where the Co—S calcined body magnet powder was added. On the other hand, when the Zn—S calcined body magnet powder was added, increase in $B_r$ was detected in the same n range.

EXAMPLE 5

First, a finely pulverized slurry was prepared as in Sample No. 1 of the first example except that the slurry was finely pulverized to a mean particle size of about 1.0 µm as measured by the air permeability method. Thereafter, the slurry was dried, crushed and then thermally treated at a temperature of 500° C. to 1,200° C., thereby preparing a ferrite magnet powder.

Figure 4:
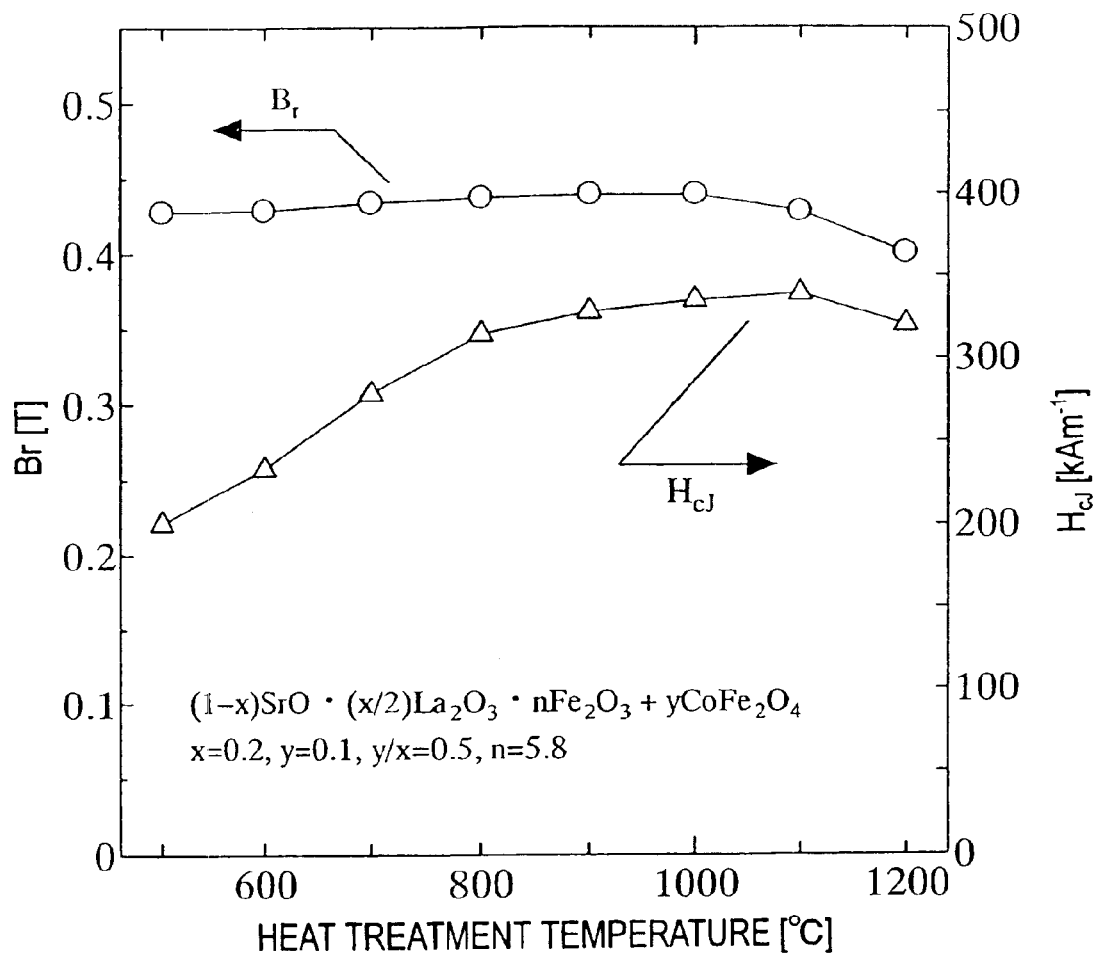
FIG. 4 is a graph showing a relationship between the heat treatment temperature and the remanence $B_r$ and a relationship between the heat treatment temperature and the coercivity $H_{cJ}$ in a ferrite magnet powder according to the present invention, which is represented by $(1-x)$ $SrO.(x/2)$ $La_2O_3.n$ $Fe_2O_3+y$ $CoFe_2O_4$ (where x=0.2, y=0.1, y/x=0.5 and n=5.8)

$B_r$ and $H_{cJ}$ of the resultant powder were measured with a vibrating sample magnetometer (VSM). The results are shown in FIG. 4. As can be seen from FIG. 4, $H_{cJ}$ increased if the heat treatment was carried out at a temperature of less than 1,100° C. but decreased once that temperature was exceeded. It can also be seen that the magnetization increased along with the coercivity up to a temperature of about 1,000° C. but decreased once that temperature was exceeded.

A bonded magnet shaped for motors was made of the ferrite magnet powder and embedded in a motor instead of a bonded magnet made of the conventional material, and then the motor was operated under rated conditions. As a result, good characteristics were achieved. Also, the torque thereof was higher than that of the motor including the bonded magnet made of the conventional material.

Also, the ferrite magnet powder was used for a magnetic recording medium. As a result, a high S/N ratio was achieved at a high output.

EXAMPLE 6

Sintered bodies were prepared as in Sample No. 1 of the first example described above except that the mixtures were finely pulverized with CaO, $SiO_2$, $Cr_2O_3$ and $Al_2O_3$ added as shown in the following Table 2. $B_r$ and $H_{cJ}$ of the resultant sintered magnets are also shown in the following Table 2:

TABLE 2

| CaO (wt %) | $SiO_2$ (wt %) | $Cr_2O_3$ (wt %) | $Al_2O_3$ (wt %) | Br (T) | $H_{cJ}$ (kA/m) |
|---|---|---|---|---|---|
| 0.3 | 0.3 | 0 | 0 | 0.439 | 327 |
| 0.6 | 0.3 | 0 | 0 | 0.443 | 324 |
| 0.6 | 0.45 | 1.0 | 1.0 | 0.427 | 355 |
| 0.6 | 0.45 | 0 | 0 | 0.443 | 329 |
| 0.6 | 0.45 | 0.5 | 0.5 | 0.436 | 347 |

EXAMPLE 7

Figure 5:
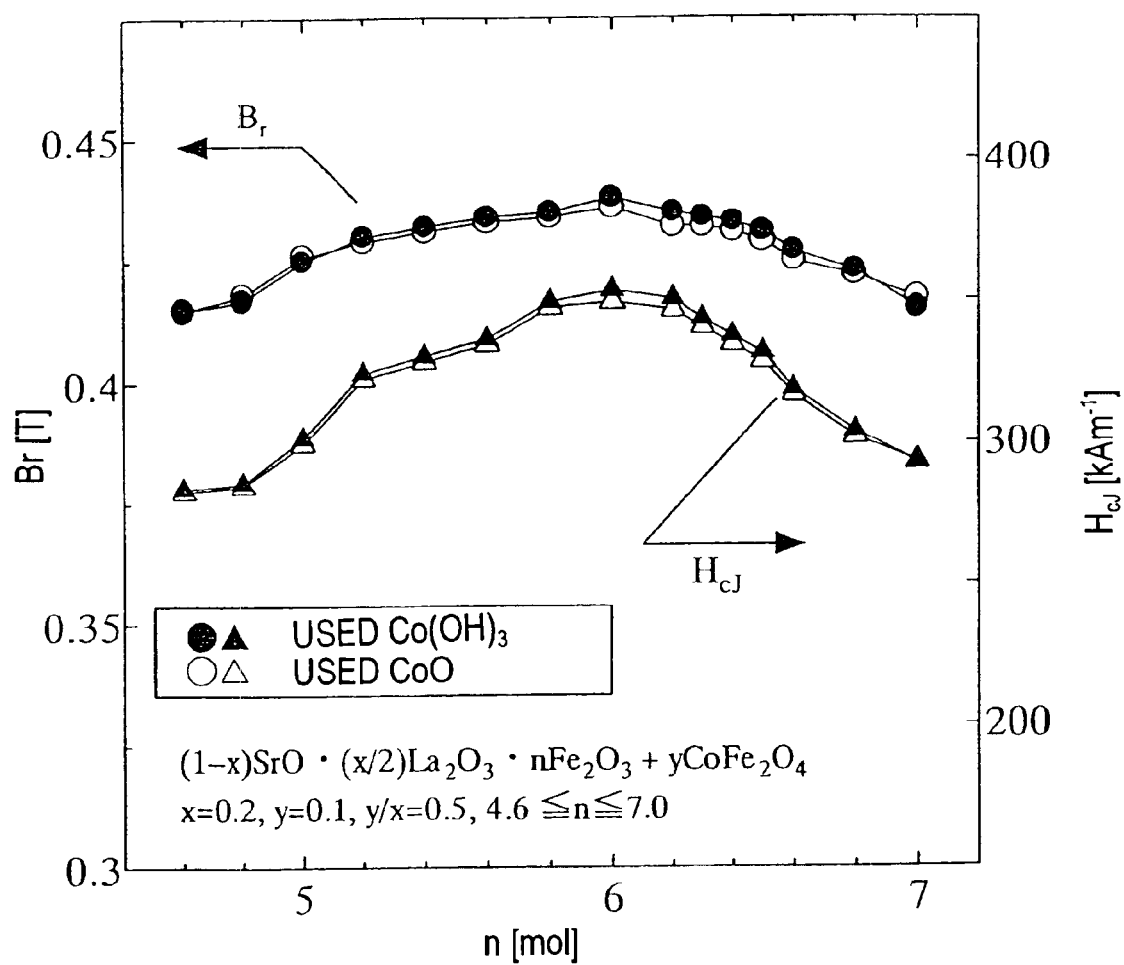
FIG. 5 is a graph showing a relationship between the mole fraction n and the remanence $B_r$ and a relationship between the mole fraction n and the coercivity $H_{cJ}$ in a sintered magnet according to the present invention, which is obtained by using $Co(OH)_3$ as a Co material and represented by $(1-x)$ $SrO.(x/2)$ $La_2O_3.n$ $Fe_2O_3+y$ $CoFe_2O_4$ (where x=0.2, y=0.1, y/x=0.5 and $4.6 \leq n \leq 7.0$).

A sintered body was prepared as in the fourth example described above except that a $Co(OH)_3$ powder was used as a Co material instead of the CoO powder. $B_r$ and $H_{cJ}$ of the resultant sintered magnet were measured. The results are shown in FIG. 5. As can be clearly seen from FIG. 5, better properties were achieved by using the $Co(OH)_3$ powder than by using the CoO powder. Specifically, when the $Co(OH)_3$ powder was used, particularly good properties were achieved in the range in which n>6.0 was satisfied. As for the other elements M (i.e., Ni, Mn and Zn), similar results were obtained.

The following Samples Nos. 8 through 16 were also prepared, and $B_r$ and $H_{cJ}$ of the resultant sintered magnets were measured. The results are shown in the following Table 3. The sintered magnets representing the respective samples were obtained as in Sample No. 1 of the first example described above.

Sample No. 8: obtained by adding 0.5 wt % of $SrSO_4$ as an Sr material to a portion of $SrCO_3$;

Sample No. 9: obtained by adding 1.0 wt % of $SrSO_4$ as an Sr material to a portion of $SrCO_3$;

Sample No. 10: obtained by adding 2.0 wt % of $SrSO_4$ as an Sr material to a portion of $SrCO_3$;

Sample No. 11: obtained by adding 0.2 wt % of $H_3BO_3$ while respective material powders were mixed together to make an M-type ferrite calcined body magnet powder;

Sample No. 12: obtained by adding 0.5 wt % of $H_3BO_3$ while respective material powders were mixed together to make an M-type ferrite calcined body magnet powder;

Sample No. 13: obtained by adding 1.0 wt % of $H_3BO_3$ while respective material powders were mixed together to make an M-type ferrite calcined body magnet powder;

Sample No. 14: obtained by using a $Co(OH)_3$ powder as a Co material instead of the CoO powder and adding 1.0 wt % of $SrSO_4$ as an Sr material to a portion of $SrCO_3$;

Sample No. 15: obtained by using a $Co(OH)_3$ powder as a Co material instead of the CoO powder and adding 0.5 wt % of $H_3BO_3$ while respective material powders were mixed together to make an M-type ferrite calcined body magnet powder; and Sample No. 16: obtained by using a $Co(OH)_3$ powder as a Co material instead of the CoO powder, adding 0.5 wt % of $H_3BO_3$ while respective material powders were mixed together to make an M-type ferrite calcined body magnet powder, and adding 1.0 wt % of $SrSO_4$ as an Sr material to a portion of $SrCO_3$.

TABLE 3

| Sample | $J_s$ (T) | Br (T) | $H_{cJ}$ (kA/m) |
|---|---|---|---|
| 8 | 0.447 | 0.434 | 350 |
| 9 | 0.446 | 0.433 | 352 |
| 10 | 0.442 | 0.430 | 355 |
| 11 | 0.447 | 0.434 | 349 |
| 12 | 0.448 | 0.434 | 347 |
| 13 | 0.445 | 0.432 | 345 |
| 14 | 0.447 | 0.434 | 352 |
| 15 | 0.441 | 0.434 | 349 |
| 16 | 0.448 | 0.434 | 351 |

INDUSTRIAL APPLICABILITY

According to the present invention, a ferrite having a spinel-type structure is added to a ferrite having a hexagonal M-type magnetoplumbite structure, in which a portion of Sr, for example, has been replaced with an element R that includes La at least. In this manner, a low manufacturing cost is achieved and yet the magnetic properties of the ferrite magnet can be improved.

What is claimed is:

1. A method of making a ferrite calcined body, the method comprising the steps of:
preparing a material powder mixture by mixing: a material powder of at least one compound that is selected from the group consisting of $SrCO_3$, $BaCO_3$, PbO and $CaCO_3$; an oxide material powder of at least one element to be selected from the group consisting of the rare-earth elements (including Y) and Bi, the oxide material powder always including $La_2O_3$; and a material powder of $Fe_2O_3$;
calcining the material powder mixture at a temperature of 1,100° C. to 1,450° C., thereby forming a ferrite calcined body having an M-type magnetoplumbite structure and a composition represented by the general formula:

$$(1-x)AO.(x/2)R_2O_3.n\ Fe_2O_3$$

where A is at least one element selected from the group consisting of Sr, Ba, Pb and Ca; R is at least one element selected from the group consisting of the rare-earth elements (including Y) and Bi and always includes La; $0.05 \leq x < 0.3$; and $5.0 \leq n \leq 6.5$;

preparing another material powder mixture by mixing an oxide material powder of at least one element selected from the group consisting of Co, Ni, Mn and Zn and a material powder of $Fe_2O_3$;

calcining the material powder mixture at a temperature of 700° C. to 1,450° C., thereby forming a ferrite calcined body having a spinel-type structure and a composition represented by the general formula:

$$MO.Fe_2O_3$$

where M is at least one element selected from the group consisting of Co, Ni, Mn and Zn; and preparing a calcined body by adding the ferrite calcined body having the spinel-type structure at 0.2 wt % to 6.2 wt % to the ferrite calcined body having the M-type magnetoplumbite structure.

2. A method of making a ferrite calcined body, the method comprising the steps of:
preparing a mixed solution, in which a chloride of at least one element that is selected from the group consisting of Sr, Ba, Pb and Ca, a chloride of at least one element R that is selected from the group consisting of the rare-earth elements (including Y) and Bi and that always includes La, and a chloride of Fe are dissolved and which satisfies pH<6;

calcining the mixed solution by spraying the mixed solution into an atmosphere that has been heated to a temperature of 800° C. to 1,400° C., thereby forming a ferrite calcined body having an M-type magnetoplumbite structure and a composition represented by the general formula:

$$(1-x)AO.(x/2)R_2O_3.n\ Fe_2O_3$$

where A is at least one element selected from the group consisting of Sr, Ba, Pb and Ca; R is at least one element selected from the group consisting of the rare-earth elements (including Y) and Bi and always includes La; $0.05 \leq x < 0.3$; and $5.0 \leq n \leq 6.5$;

preparing another material powder mixture by mixing an oxide material powder of at least one element selected from the group consisting of Co, Ni, Mn and Zn and a material powder of $Fe_2O_3$;

calcining the material powder mixture at a temperature of 700° C. to 1,450° C., thereby forming a ferrite calcined body having a spinel-type structure and a composition represented by the general formula:

$$MO.Fe_2O_3$$

where M is at least one element selected from the group consisting of Co, Ni, Mn and Zn; and preparing a calcined body mixed powder by adding the ferrite calcined body having the spinel-type structure at 0.2 wt % to 6.2 wt % to the ferrite calcined body having the M-type magnetoplumbite structure.

3. A method of making a ferrite calcined body, the method comprising the steps of:
pulverizing the calcined body, formed by the method of claim 1 or 2, to obtain a ferrite pulverized powder having a mean particle size of 0.2 µm to 2.0 µm when the size is measured by an air permeability method; and calcining the ferrite pulverized powder again at a temperature of 900° C. to 1,450° C.

4. The method of one of claim 1 or 2, wherein the oxide of the element M is partially or fully replaced with a hydroxide of the element M.

5. The method of one of claim 1, wherein a sulfate of the element A or a sulfate of the element R is added to the material powder mixture.

6. The method of one of claim 2, wherein a sulfate of the element A or a sulfate of the element R is added to the mixed solution.

7. The method of one of claims 1, 2, 5, 6, wherein at least one of the step of preparing the material powder mixture, the step of preparing the mixed solution, and the step of pulverizing the ferrite calcined body includes adding $B_2O_3$ and/or $H_3BO_3$.

8. A method of making a magnet powder comprising the step of pulverizing the calcined body, obtained by the method of one of claim 1, 2, 5, or 6, such that a mean particle size thereof becomes 0.2 μm to 2.0 μm measured by an air permeability method.

9. A method of making a magnet powder, the method comprising steps of:
preparing a calcined body mixed powder by adding 0.3 wt % to 1.5 wt % of CaO, 0.2 wt % to 1.0 wt % of $SiO_2$, 0 wt % to 5.0 wt % of $Cr_2O_3$, and 0 wt % to 5.0 wt % of $Al_2O_3$ to the calcined body obtained by the method of one of claim 3, 4, 7, or 8, and
pulverizing the calcined body mixed powder to obtain a ferrite pulverized powder having a mean particle size of 0.2 μm to 2.0 μm when the size is measured by an air permeability method.

10. A magnetic recording medium comprising a ferrite magnet powder, the ferrite magnet powder comprising an oxide magnetic material including a ferrite having a hexagonal M-type magnetoplumbite structure as a main phase, the oxide magnetic material comprising:
A, which is at least one element selected from the group consisting of Sr, Ba, Pb and Ca;
R, which is at least one element selected from the group consisting of the rare-earth elements (including Y) and Bi and which always includes La; and
Fe,
wherein the ratio of the constituents A, R and Fe of the oxide magnetic material is represented by:

$$(1-x)AO.(x/2)R_2O_3.n\, Fe_2O_3 \qquad \text{Formula 1}$$

where $0.05 \leq x < 0.3$, and
$5.0 \leq n \leq 6.5$, and
wherein another oxide magnetic material, including a ferrite having a spinel-type structure as a main phase, is added at 0.2 wt % to 6.2 wt % to the oxide magnet material including the ferrite having the hexagonal M-type magnetoplumbite structure as its main phase, the oxide magnetic material to be added being represented by:

$$MO.Fe_2O_3(MFe_2O_4) \qquad \text{Formula 2}$$

where M is at least one element selected from the group consisting of Co, Ni, Mn and Zn.

11. A bonded magnet comprising a ferrite magnet powder, the ferrite magnet powder comprising an oxide magnetic material including a ferrite having a hexagonal M-type magnetoplumbite structure as a main phase, the oxide magnetic material comprising:
A, which is at least one element selected from the group consisting of Sr, Ba, Pb and Ca;
R, which is at least one element selected from the group consisting of the rare-earth elements (including Y) and Bi and which always includes La; and
Fe,
wherein the ratio of the constituents A, R and Fe of the oxide magnetic material is represented by:

$$(1-x)AO.(x/2)R_2O_3.n\, Fe_2O_3 \qquad \text{Formula 1}$$

where $0.05 \leq x < 0.3$, and
$5.0 \leq n \leq 6.5$, and
wherein another oxide magnetic material, including a ferrite having a spinel-type structure as a main phase, is added at 0.2 wt % to 6.2 wt % to the oxide magnet material including the ferrite having the hexagonal M-type magnetoplumbite structure as its main phase, the oxide magnetic material to be added being represented by:

$$MO.Fe_2O_3(MFe_2O_4) \qquad \text{Formula 2}$$

where M is at least one element selected from the group consisting of Co, Ni, Mn and Zn.

12. A sintered magnet a ferrite magnet powder, the ferrite magnet powder comprising an oxide magnetic material including a ferrite having a hexagonal M-type magnetoplumbite structure as a main phase, the oxide magnetic material comprising:
A, which is at least one element selected from the group consisting of Sr, Ba, Pb and Ca;
R, which is at least one element selected from the group consisting of the rare-earth elements (including Y) and Bi and which always includes La; and
Fe,
wherein the ratio of the constituents A, R and Fe of the oxide magnetic material is represented by:

$$(1-x)AO.(x/2)R_2O_3.n\, Fe_2O_3 \qquad \text{Formula 1}$$

where $0.05 \leq x < 0.3$, and
$5.0 \leq n \leq 6.5$, and
wherein another oxide magnetic material, including a ferrite having a spinel-type structure as a main phase, is added at 0.2 wt % to 6.2 wt % to the oxide magnet material including the ferrite having the hexagonal M-type magnetoplumbite structure as its main phase, the oxide magnetic material to be added being represented by:

$$MO.Fe_2O_3(MFe_2O_4) \qquad \text{Formula 2}$$

where M is at least one element selected from the group consisting of Co, Ni, Mn and Zn.

13. A method for producing a magnet, the method comprising the steps of:
providing a magnet powder made from the ferrite calcined body produced by the method of claim 1 or 2;
subjecting the magnet powder, to a heat treatment, and
making a bonded magnet of the magnet powder that has been subjected to the heat treatment.

14. The method of claim 13, wherein the heat treatment is carried out at a temperature of 700° C. to 1,100° C.

15. A sintered magnet, which is made of the ferrite magnet powder and which includes CaO, SiO$_2$, Cr$_2$O$_3$, and Al$_2$O$_3$ at the percentages of:

0.3 wt % to 1.5 wt % (CaO), 0.2 wt % to 1.0 wt % (SiO$_2$), 0 wt % to 5.0 wt % (Cr$_2$O$_3$), and 0 wt % to 5.0 wt % (Al$_2$O$_3$), respectively.

wherein the ferrite magnet powder comprises an oxide magnetic material including a ferrite having a hexagonal M-type magnetoplumbite structure as a main phase, the oxide magnetic material comprising:

A, which is at least one element selected from the group consisting of Sr, Ba, Pb and Ca;

R, which is at least one element selected from the group consisting of the rare-earth elements (including Y) and Bi and which always includes La; and Fe, wherein the ratio of the constituents A, R and Fe of the oxide magnetic material is represented by:

$(1-x)AO\cdot(x/2)R_2O_3\cdot n\ Fe_2O_3$      Formula 1 where $0.05 \leq x < 0.3$, and $5.0 \leq n \leq 6.5$, and wherein another oxide magnetic material, including a ferrite having a spinel-type structure as a main phase, is added at 0.2 wt % to 6.2 wt % to the oxide magnet material including the ferrite having the hexagonal M-type magnetoplumbite structure as its main phase, the oxide magnetic material to be added being represented by:

$MO\cdot Fe_2O_3(MFe_2O_4)$      Formula 2 where M is at least one element selected from the group consisting of Co, Ni, Mn and Zn.

16. A method for producing a sintered magnet, the method comprising the steps of:

providing a magnet powder made from the ferrite calcined body produced by the method of claim 1 or 2, and condensing, mulling, compacting and sintering the magnet powder, where the magnet powder is compacted with or without a magnetic field applied thereto.

17. A method for producing a sintered magnet, the method comprising the steps of:

providing a magnet powder made from the ferrite calcined body produced by the method of claims 1 and 2, and condensing, mulling, drying, crushing, compacting and sintering the magnet powder, where the magnet powder is compacted with or without a magnetic field applied thereto.

18. The method of claim 3, wherein the step of pulverizing or a step of mulling includes the step of adding a dispersant at a solid matter ratio of 0.2 wt % to 2.0 wt %.

19. A magnetic recording medium comprising a thin-film magnetic layer that includes an oxide magnetic material including a ferrite having a hexagonal M-type magnetoplumbite structure as a main phase, the oxide magnetic material comprising:

A, which is at least one element selected from the group consisting of Sr, Ba, Pb and Ca;

R, which is at least one element selected from the group consisting of the rare-earth elements (including Y) and Bi and which always includes La; and Fe, wherein the ratio of the constituents A, R and Fe of the oxide magnetic material is represented by:

$(1-x)AO\cdot(x/2)R_2O_3\cdot n\ Fe_2O_3$      Formula 1 where $0.05 \leq x < 0.3$, and $5.0 \leq n \leq 6.5$, and wherein another oxide magnetic material, including a ferrite having a spinel-type structure as a main phase, is added at 0.2 wt % to 6.2 wt % to the oxide magnet material including the ferrite having the hexagonal M-type magnetoplumbite structure as its main phase, the oxide magnetic material to be added being represented by:

$MO\cdot Fe_2O_3(MFe_2O_4)$      Formula 2 where M is at least one element selected from the group consisting of Co, Ni, Mn and Zn.

* * * * *